United States Patent
Malecki

[11] Patent Number: 5,839,358
[45] Date of Patent: Nov. 24, 1998

[54] KNEADING PADDLE EXTRACTION DEVICE

[76] Inventor: Edward Malecki, 2225 E. Midwick Dr., Altadena, Calif. 91001

[21] Appl. No.: 946,874

[22] Filed: Oct. 8, 1997

[51] Int. Cl.[6] .............................. A21B 1/00; A21D 8/00; A47J 27/00; A47J 45/00

[52] U.S. Cl. .............................. 99/348; 81/3.55; 81/3.57; 99/357; 99/468; 294/26; 294/99.2; 366/98; 366/146; 366/314

[58] Field of Search ..................... 99/348, 357, 325–328, 99/331–335, 467, 468, 484; 366/69, 96–98, 144–146, 314, 601; 426/27, 504, 512; 81/3.45, 3.55, 3.57, 427; 294/26, 27.1, 16, 99.2, 93

[56] References Cited

U.S. PATENT DOCUMENTS

| | | | |
|---|---|---|---|
| 2,234,715 | 3/1941 | Whitney | 27/1 |
| 3,019,521 | 2/1962 | Clark | 29/283 |
| 4,631,769 | 12/1986 | White | 81/3.55 X |
| 4,826,227 | 5/1989 | Lew | 294/16 |
| 4,957,040 | 9/1990 | Nakahura et al. | 99/348 |
| 4,984,512 | 1/1991 | Takahashi et al. | 99/327 |
| 5,048,402 | 9/1991 | Letournel et al. | 99/348 |
| 5,076,153 | 12/1991 | Takahashi et al. | 99/327 |
| 5,351,606 | 10/1994 | Matsuzaki | 99/348 |
| 5,380,086 | 1/1995 | Dickson | 366/314 X |
| 5,401,159 | 3/1995 | Hsu | 99/348 |
| 5,402,710 | 4/1995 | Chen | 99/348 |
| 5,415,081 | 5/1995 | Yoshida et al. | 366/98 X |
| 5,421,630 | 6/1995 | Sergi et al. | 294/93 |
| 5,433,139 | 7/1995 | Kitagawa et al. | 99/327 |
| 5,435,235 | 7/1995 | Yoshida | 366/601 X |
| 5,510,127 | 4/1996 | Wong et al. | 426/19 |
| 5,528,979 | 6/1996 | Yoshida | 99/327 |
| 5,535,665 | 7/1996 | Wong | 99/348 |
| 5,588,343 | 12/1996 | Glucksman et al. | 99/348 |
| 5,601,012 | 2/1997 | Ellner | 426/391 X |
| 5,611,266 | 3/1997 | Kensrue | 99/485 X |
| 5,660,099 | 8/1997 | Figueira, Jr. | 99/348 X |
| 5,692,431 | 12/1997 | Herring | 99/426 |
| 5,694,832 | 12/1997 | Kakimoto et al. | 99/348 |

*Primary Examiner*—Timothy F. Simone
*Attorney, Agent, or Firm*—Lyon & Lyon LLP

[57] ABSTRACT

A kneading paddle extraction device for removing the kneading paddle from a loaf of bread made by an automatic bread making machine, while minimizing damage to the loaf, is provided. A kneading paddle containing a substantially central aperture for receiving a motor shaft is grasped by one or more rods, each rod having a hook which is inserted through the aperture, with the preferred embodiment additionally utilizing a sliding wedge for grasping the kneading paddle.

15 Claims, 11 Drawing Sheets

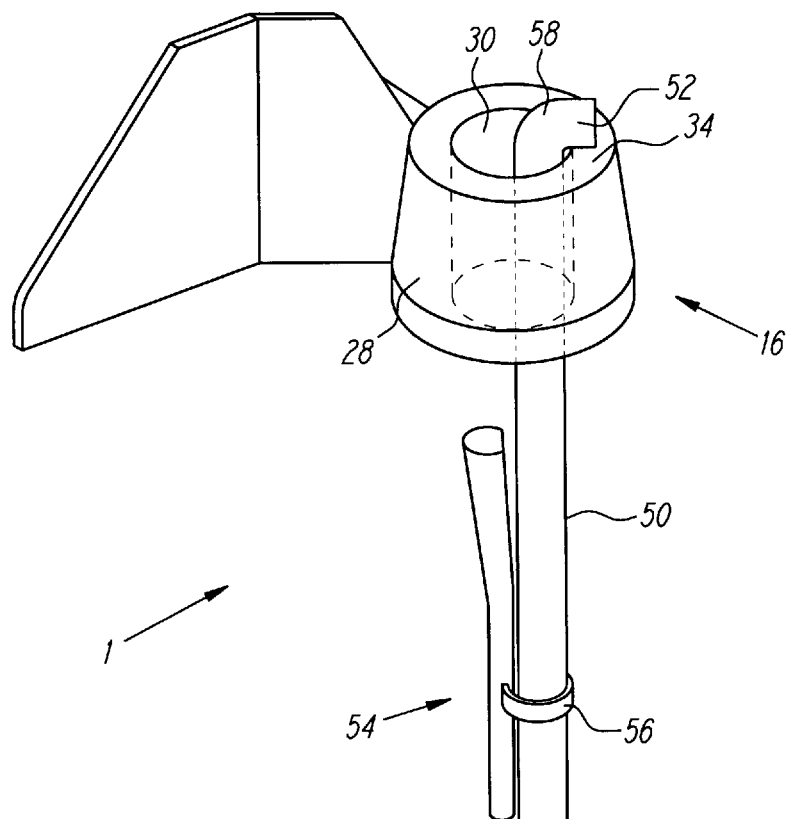
FIG. 5a
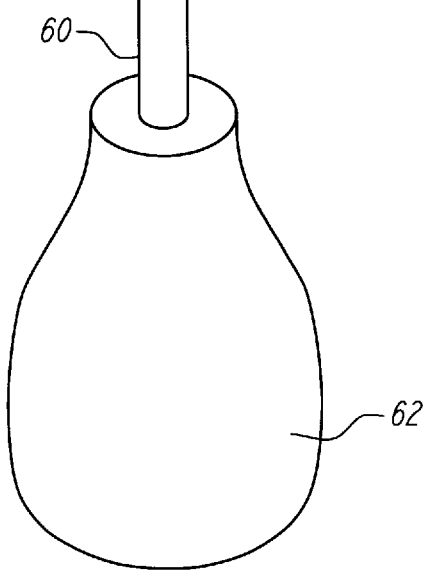

KNEADING PADDLE EXTRACTION DEVICE

FIELD OF THE INVENTION

The present invention relates to devices used in conjunction with an automatic bread-making machine and, more particularly, to devices used for removing the kneading paddle from a loaf of bread made by such a machine.

BACKGROUND OF THE INVENTION

Most commercially available automatic bread-making machines employ a removable paddle to mix and knead ingredients, including flour, water, and yeast, to make bread. The kneading paddle typically has a hub which has an aperture with one or more mating surfaces. The mating surfaces permit the kneading paddle to be fitted over a mixing assembly drive shaft which extends upward through the bottom of a removable bread pan. Such a kneading paddle is designed to slip easily on and off the drive shaft so that a loaf of bread may be removed from the bread-making machine when the baking process is complete. Usually, the process of removing a loaf of bread requires the removal of the bread pan from the machine, then the removal of the bread loaf from the bread pan, and finally the removal of the kneading paddle which is baked into the bottom of the bread loaf.

Although the removable kneading paddle does not hinder removal of the bread loaf from the bread pan, it is inconvenient and frequently difficult to remove the kneading paddle from the bread. Typically, the bottom of the bread loaf surrounds the kneading paddle completely, leaving only the kneading paddle aperture exposed. Such circumstances present the user with no surfaces by which the paddle may be readily grabbed and removed from the bread using hands or conventional tools. Further, the user has no indication of which direction the kneading surfaces of the paddle are facing, and therefore the user must "dig" into the bottom of the bread loaf to locate them. This "digging" wastes a significant volume of bread and often leaves a large and unsightly hole in the loaf. Additionally, if the bread is still hot, the user may not touch the kneading paddle without suffering burns to his hands. Once the paddle becomes cool enough to touch, removing the paddle without heavily damaging the bread becomes even more difficult.

SUMMARY OF THE INVENTION

The present invention provides a new device for, and method of, extracting a typical kneading paddle having a hub with an aperture from a bread loaf made by an automatic bread-making machine. A preferred embodiment of the device according the present invention includes a rod which may be inserted into the aperture, the rod having at the insertion end a hook to engage the upper surface of the kneading paddle hub, and a wedge which slides along the rod to engage at least one of the mating surfaces of the aperture. After the insertion end of the rod is inserted into the aperture and the hook of the rod engages the upper surface of the kneading paddle hub, the wedge may be slid into the aperture to couple this embodiment of the device to the paddle. Once coupled, the device and kneading paddle may be manually pulled from the loaf quickly without the user ever touching the hot paddle or loaf with his bare hands.

Alternative embodiments of the device according to the present invention function similarly to the preferred embodiment, using one or more rods with hooks which are inserted into the aperture of the kneading paddle hub. However, these alternative embodiments utilize features other than a sliding wedge to couple the device to the kneading paddle and thereby permit the paddle to be pulled and removed from the bread.

One alternative embodiment of the device according to the present invention includes a rod and a hook at the insertion end of the rod, but does not include a sliding wedge. The user inserts the hook through the aperture of the kneading paddle hub, and engages the hook against the upper surface of the hub. Once the hook is so engaged, manual pressure by the user in a direction opposite that in which the hook projects is required to couple this embodiment of the device to the paddle.

Another alternative embodiment of the device according to the present invention includes two rods, each having a hook at the insertion end of the rod, and a connector which allows the two rods to be rotated along a central longitudinal axis. By way of example, a hinge may be used as such a connector. After the hooks are inserted through the aperture of the kneading paddle hub and engaged against the hub upper surface, the rotation of one rod relative to the other couples this embodiment of the device to the paddle.

Yet other alternative embodiments of the device according to the present invention also include two rods, each rod having a hook at the insertion end. In these embodiments, however, the two rods are joined to form a Y-spring. In one such embodiment, manual compression of the Y-spring is required to allow the hooks to be inserted into the aperture, and (after insertion) decompression of the Y-spring couples this embodiment of the device to the paddle. In a similar alternative embodiment, the Y-spring is sufficiently narrow in the relaxed position to permit the hooks to be inserted into the aperture. After insertion of the hooks through the aperture, compression of the Y-spring couples this embodiment of the device to the paddle.

Further alternative embodiments of the device according to the present invention include three rods, each rod having a hook at the insertion end, with the three rods being attached along their longitudinal axes to form a W-spring. In one instance, manual compression of the W-spring allows the hooks to be inserted into the aperture, and decompression of the W-spring couples this embodiment of the device to the paddle. In another instance, the W-spring is sufficiently narrow in the relaxed position to permit the hooks to be inserted into the aperture, and compression of the Y-spring couples this embodiment of the present invention to the paddle.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 5a provides a perspective view of a preferred embodiment of the present invention, the preferred embodiment employing a wedge, with the wedge in a position retracted from the kneading paddle.

FIGS. 7b–7d provide a plan view of the operation of the second alternative embodiment of the present invention illustrated in FIG. 7a.

DETAILED DESCRIPTION OF THE DRAWINGS

Figure 1:
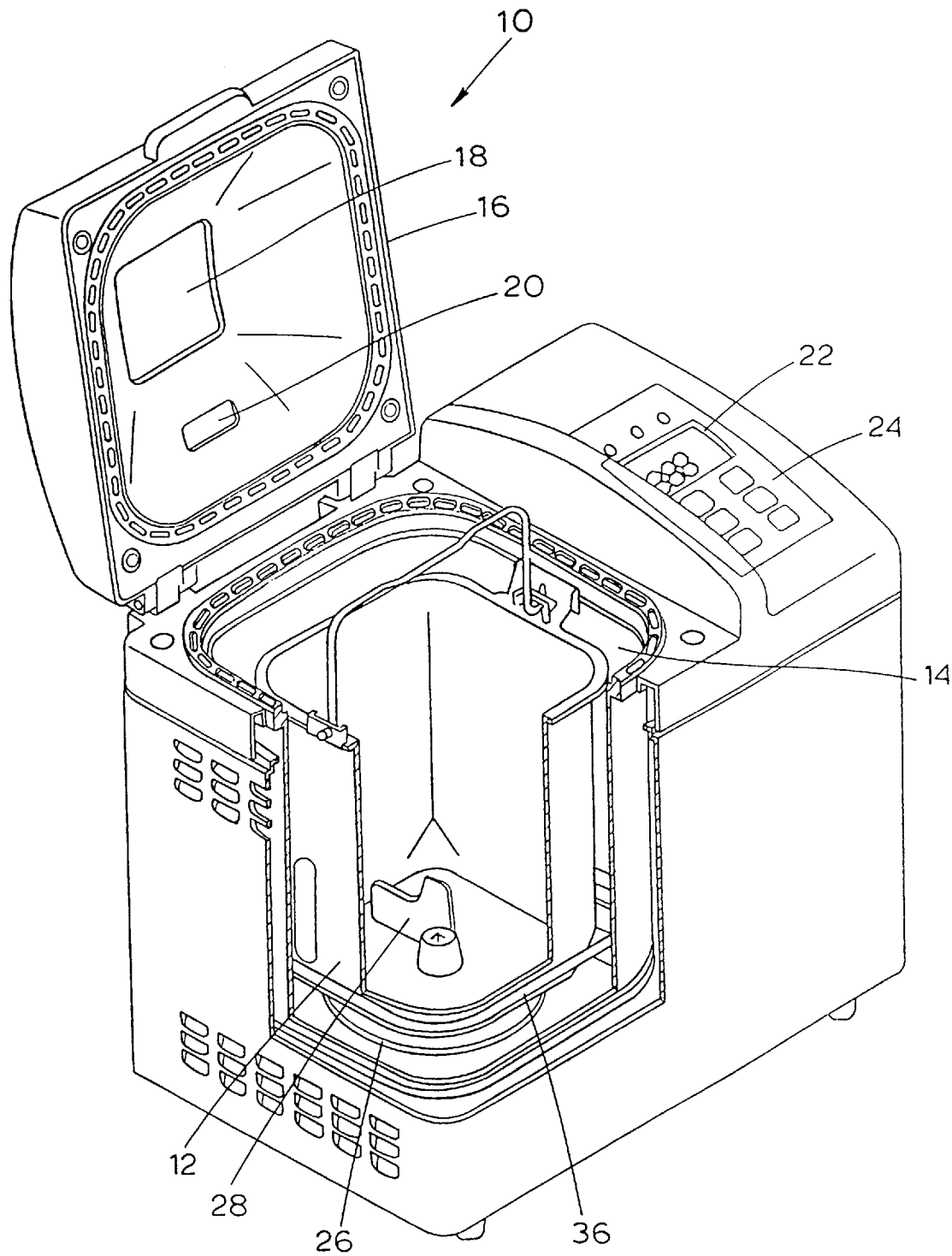
FIG. 1 provides a partially cut-away perspective view of a typical automatic bread-making machine.
Figure 2:
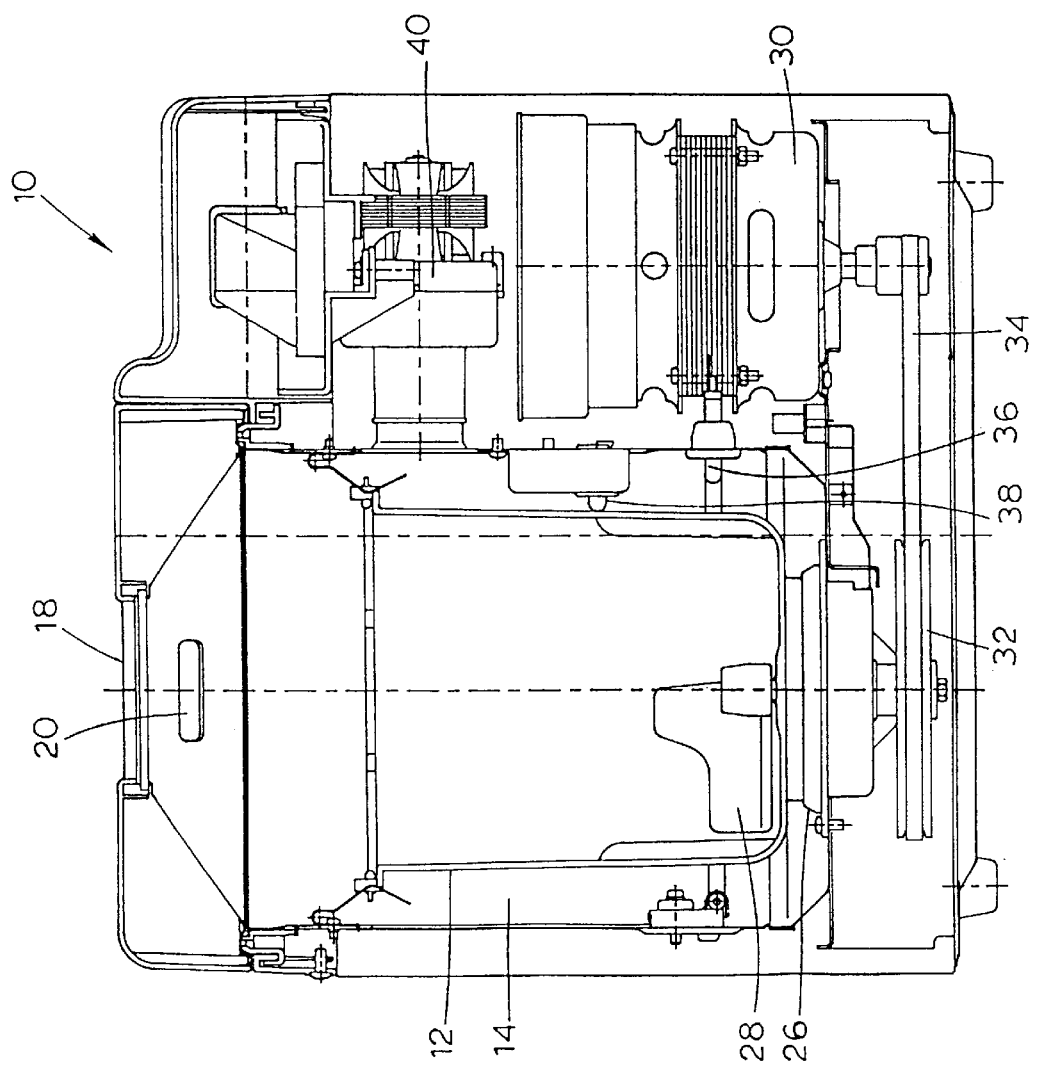
FIG. 2 provides a side sectional view of a typical automatic bread-making machine and kneading paddle.

FIGS. 1 and 2 illustrate partial cut-away perspective and plan views of a typical automatic bread-making machine. As relevant to the present invention, the bread making machine 10 contains a removable bread pan 12, through which a kneading shaft 14 protrudes to connect a kneading paddle 16 inside the bread pan to a belt-driven mixer assembly 18 external to the bread pan.

Figure 3A:
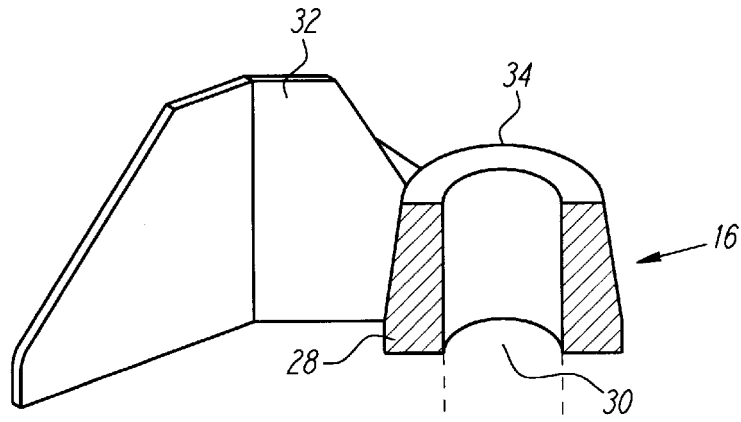
FIG. 3a provides a partially cut-away perspective view of a typical kneading paddle and a perspective view of a corresponding kneading shaft for an automatic bread-making machine.

FIG. 3a illustrates a perspective view of a typical kneading shaft 14 and partial cut-away perspective view of a corresponding typical kneading paddle 16. The kneading shaft 14 contains a base 20 with raised surfaces 22 for engaging the belt-driven mixer assembly 18. The shaft member 24 contains one or more shaft torque transfer surfaces 26 for transmitting torque to the kneading paddle 16. The kneading paddle 16 contains a kneading paddle hub 28 with an aperture 30 protruding upward through the hub 28. It is believed that typical kneading shafts 14 have nominal outside diameters of approximately 0.5 inches, with the corresponding nominal inside diameters of apertures 30 being only incrementally larger in dimension. Upper surface 34 of kneading paddle hub 28 forms the upper boundary of aperture 30. One or more kneading paddle faces 32 protrude outward from kneading paddle hub 28 to engage and knead the contents of removable bread pan 12.

Figure 3B:
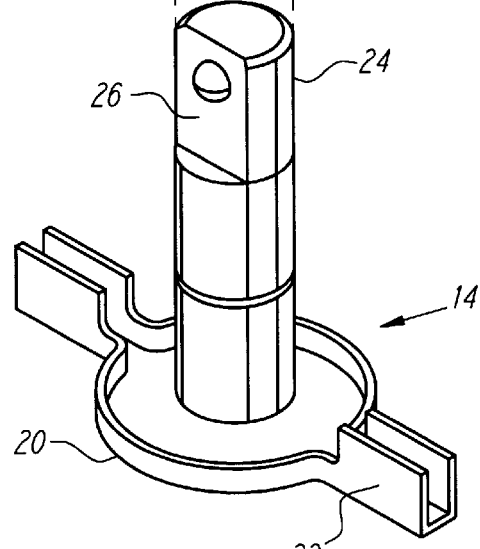
FIG. 3b provides a bottom view of a typical kneading paddle for an automatic bread-making machine.
Figure 3B:
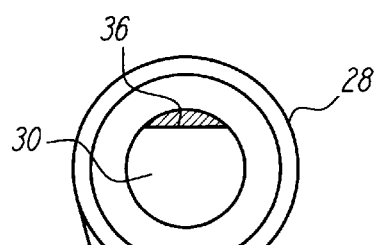
Figure 3B:
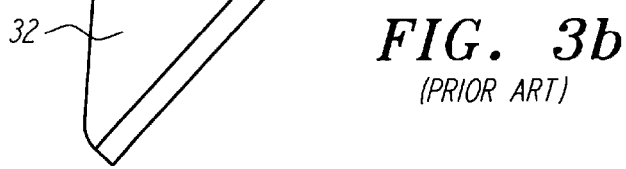
Figure 4A:
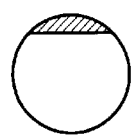
FIG. 4 provides a sectional plan view of various conventional shapes in which an aperture in a kneading paddle hub may be formed.
Figure 4B:
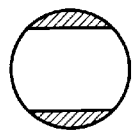
Figure 4C:
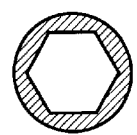
Figure 4D:
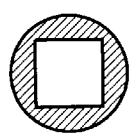
Figure 4E:
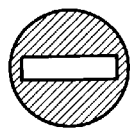
Figure 4F:
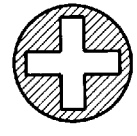
Figure 4G:
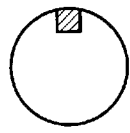
Figure 4H:
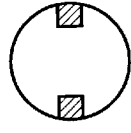
Figure 4I:
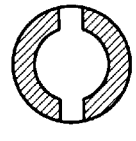
Figure 4J:
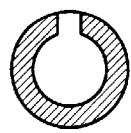

As illustrated in FIG. 3b, hub 28 contains one or more paddle torque transfer surfaces 36 to mate with corresponding shaft torque transfer surfaces 26 and thereby transmit torque to the kneading paddle 16. The hub illustrated in FIG. 3b contains a single mating surface 36. Though it is believed that shapes employing either one or two torque transfer surfaces are most commonly employed in automatic bread machine kneading shafts and paddles, a wide variety of torque transfer surface configurations would be readily known to those skilled in the art. FIG. 4, for example, illustrates several examples of known torque transfer surface configurations which could be employed in automatic bread machine kneading shafts and paddles, and which would also be compatible with one or more embodiments of the present invention.

Figure 5B:
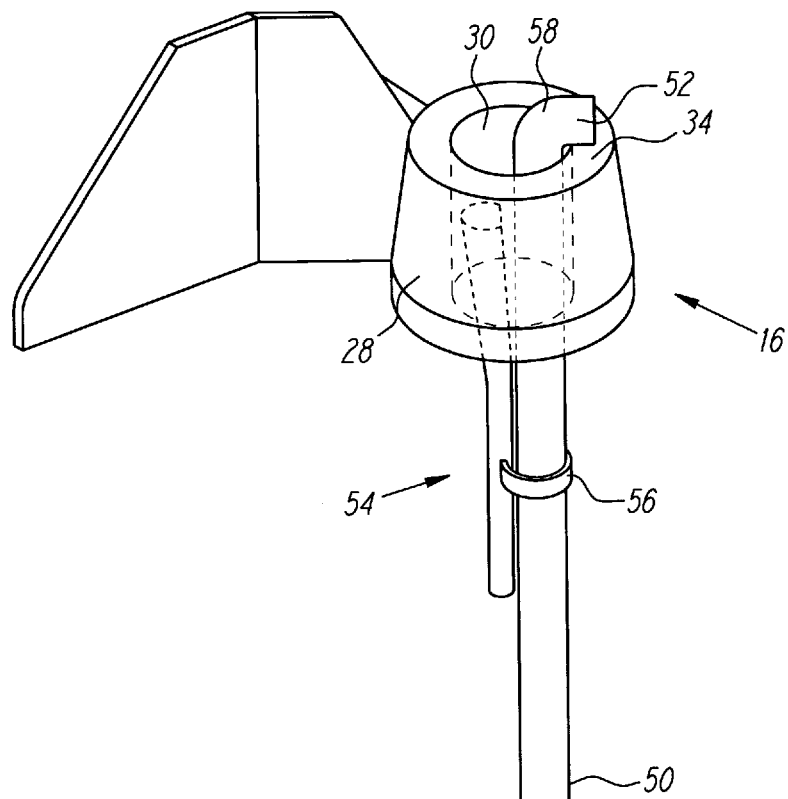
FIG. 5b provides a perspective view of a preferred embodiment of the present invention, with the wedge in a position engaged to the kneading paddle.

FIGS. 5a and 5b illustrate an extraction device 1 according to the preferred embodiment of the present invention. Extraction device 1 according to the present embodiment includes a rod 50, a hook 52 formed at the insertion end 58 of rod 50, a sliding wedge 54 which is slidably mounted to rod 50, and a wedge coupling member 56. Hook 52 is inserted into and through kneading paddle aperture 30, such that hook 52 engages upper surface 34 of hub 28. Though this embodiment illustrates a rod in the conventional sense (i.e. having a circular cross section), rods with other common cross-sectional shapes such as triangular, square, rectangular, and hexagonal may be used, as would be apparent to those skilled in the art. Rod 50 may alternatively be formed as a hollow (circular or other common-shaped cross section) tube, or as a single or compound channel—such as may be formed from metal strip stock which contains one or more longitudinal bends.

The illustrated hook 52 projects outward at an approximately right angle from the longitudinal axis of the rod. The precise angle, however, at which hook 52 projects is not critical so long as hook 52 is capable of engaging upper surface 34 of hub 28 to permit removal of kneading paddle 16 from the loaf. Moreover, although not illustrated, hook 52 may have a recurved end.

Continuing with the description of FIGS. 5a and 5b, the width of rod 50 and the length that hook 52 projects outward from rod 50 are smaller than the diameter of aperture 30 to facilitate insertion of rod 50 and hook 52 through aperture 30. Preferably, a sliding wedge 54 is coupled to rod 50 with a wedge coupling member 56 which permits wedge 54 to slide longitudinally along rod 50. Such a wedge coupling member 56 may be external to sliding wedge 54 and wrap around rod 50, as illustrated in FIG. 5a. As would be apparent to those skilled in the art, however, alternative designs for coupling wedge 54 to rod 50 would be possible. For example, wedge coupling member 56 may be integral to sliding wedge 54 and be slidably fastened to rod 50 via a longitudinal slot or central channel formed in rod 50. Preferably, wedge 54 or a portion thereof has a sectional profile that is tapered in a direction from the outward end toward the insertion end of the wedge; this tapered design has been found to enhance the locking action of the extraction device 1 according to the present embodiment to the kneading paddle hub. Alternatively, a wedge 54 or a portion thereof may have a section profile that is tapered in the opposite direction (i.e. from the insertion end toward the outward end of the wedge); this alternative tapered design permits easy insertion of the wedge into the aperture of the kneading paddle hub. In addition, it has been found that the device works best when the sectional profile of sliding wedge 54 substantially conforms to the portion of the cross-sectional shape of the interior surface of hub 28 to which wedge 54 is to be engaged.

Coupling the preferred embodiment to kneading paddle 16 is now described in connection with FIGS. 5a and 5b. As shown in FIG. 5a, wedge 54 is placed in a position retracted from kneading paddle 16 during the insertion of hook 52 through kneading paddle aperture 30. FIG. 5b illustrates that after hook 52 is engaged against upper surface 34, wedge 54 is slid toward and into aperture 30 until one or more surfaces of wedge 54 contact the interior surface of hub 28 defining aperture 30. The dual contact between hook 52 and upper surface 34, and between wedge 54 and the interior surface of hub 28 which defines aperture 30, firmly couples this embodiment to kneading paddle 16. Once coupled, manual pulling on the handle end 60 of rod 50, or pulling on an optional handle 62 affixed thereto, removes the device according to this embodiment with kneading paddle 16 from the loaf of bread.

Figure 6:
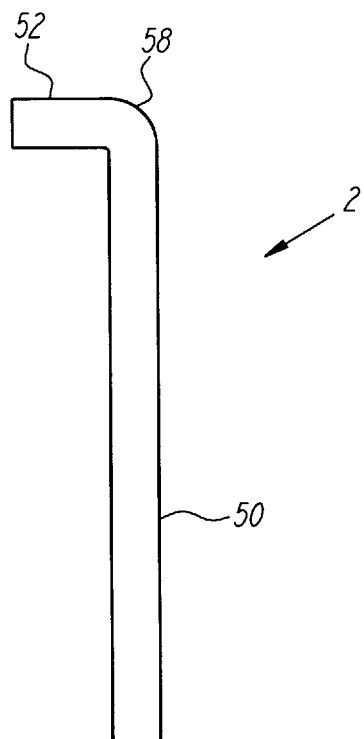
FIG. 6 provides a side view of a first alternative embodiment of the present invention, this embodiment employing a rod and a hook (but without a sliding wedge) to engage the kneading paddle.

FIG. 6 illustrates an extraction device 2 according to a first alternative embodiment of the present invention. Extraction device 2 according to the present embodiment includes a rod 50 and a hook 52 at the insertion end of the rod, but does not include a sliding wedge or wedge coupling member. The width of rod 50 and the length of hook 52 are each smaller than the diameter of aperture 30. Hook 52 is inserted through aperture 30 and hook 52 is engaged against upper surface 34 of hub 28 identically as performed with the preferred embodiment. Manual pressure is then applied to the rod in a direction opposite the direction in which hook 52 protrudes, to maintain engagement of hook 52 against upper surface 34 of hub 28 while the coupled extraction device 2 according to this embodiment and kneading paddle 16 are manually pulled from the bread loaf by handle end 60 of rod 50, or by optional handle 62 affixed thereto.

Figure 7A:
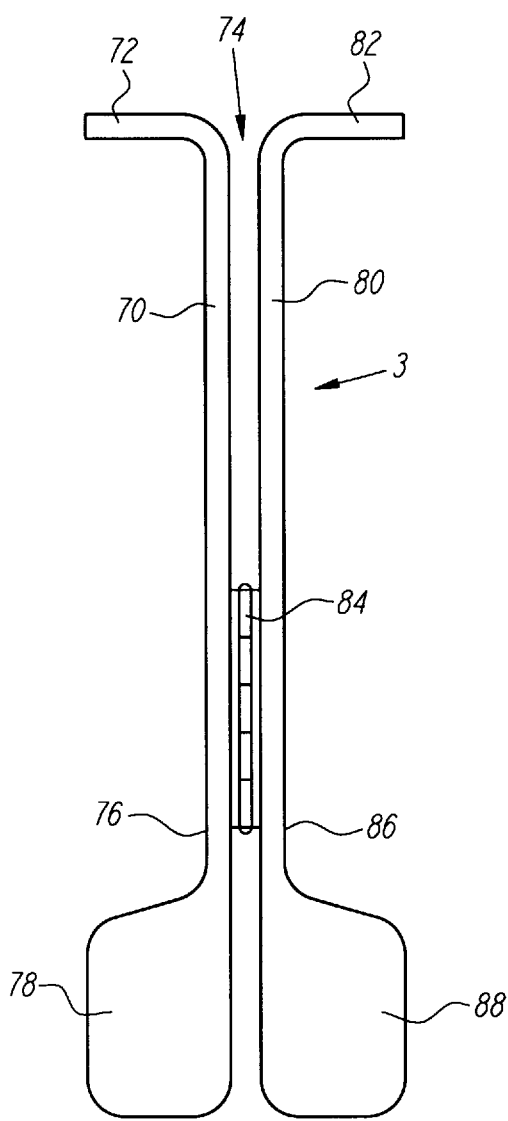
FIG. 7a provides a side view of a second alternative embodiment of the present invention, this embodiment employing two rotatably mounted rods, with the rods in a position to permit engagement of the hooks to the kneading paddle.

FIG. 7a illustrates an extraction device 3 according to a second alternative embodiment of the present invention. Extraction device 3 according to the present embodiment includes a first rod 70 and a second rod 80, the first and second rods being rotatably coupled along a longitudinal axis between the rods by means such as a hinge 84. At the insertion end 74 of rods 70 and 80 are located hooks 72 and 82, respectively, which extend outward from rods 70 and 80. Hooks 72 and 82 can be formed from rods 70 and 80, respectively, by bending a portions of rods 70 and 80 outward or by attaching separate hook members to the insertion ends of rods 70 and 80.

The combined widths of the first and second rods 70 and 80 plus the distance between the rods is sufficiently less than the diameter of aperture 30 to permit insertion of rods 70 and 80 through aperture 30. The individual lengths of hooks 72 and 82 are similarly smaller than the diameter of aperture 30, although the sum of the lengths of hooks 72 and 82 plus the distance between the rods is greater than the diameter of aperture 30 to facilitate engagement of hooks 72 and 82 against upper surface 34 of hub 28. Once coupled to kneading paddle 16, the coupled extraction device 3 according to this embodiment and kneading paddle 16 are manually pulled from the bread loaf by handle ends 76 and 86 of rods 70 and 80, or by optional handle portions 78 and 88 affixed thereto.

Figure 7B:
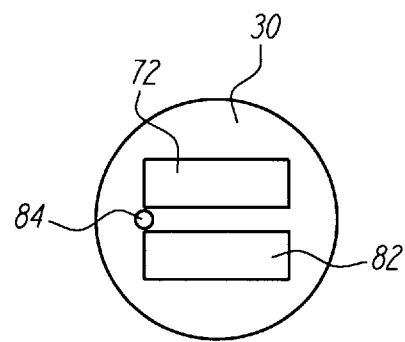

FIG. 7b illustrates a plan view of the operation of this embodiment. With rods 70 and 80 rotated to a position adjacent to one another, hooks 72 and 82 are inserted through aperture 30. After hooks 72 and 82 are positioned to rest against upper surface 34, rods 70 and 80, along with hooks 72 and 82, are rotated until hooks 72 and 82 point in opposing directions to thereby couple the device according to this embodiment to kneading paddle 16. Once coupled, manual pulling on one or both rods 70, 80 or optional handle portions 78, 88 affixed thereto removes the extraction device according to this embodiment and kneading paddle 16 from the loaf of bread.

Figure 8A:
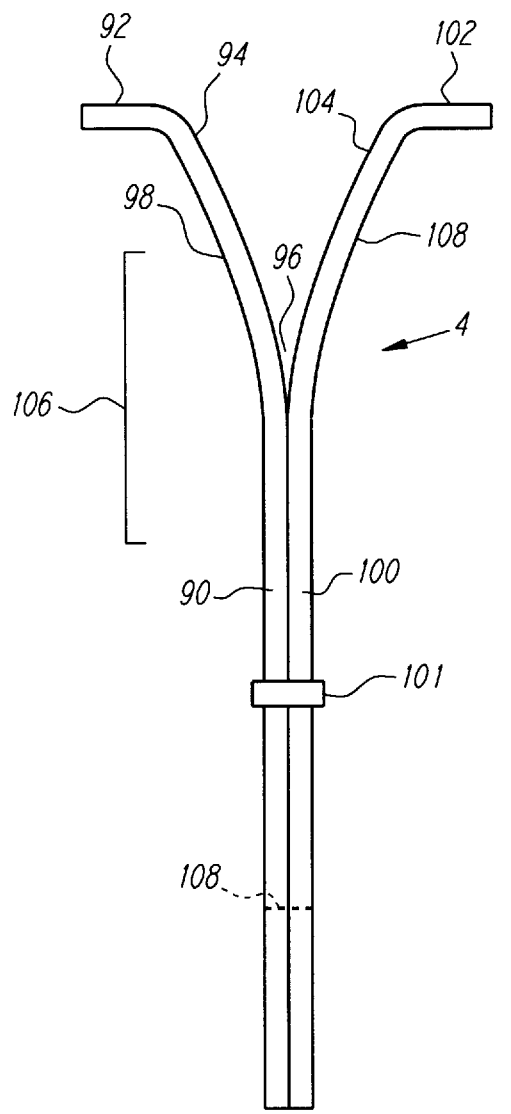
FIG. 8a provides a side view of a third alternative embodiment of the present invention.
Figure 8B:
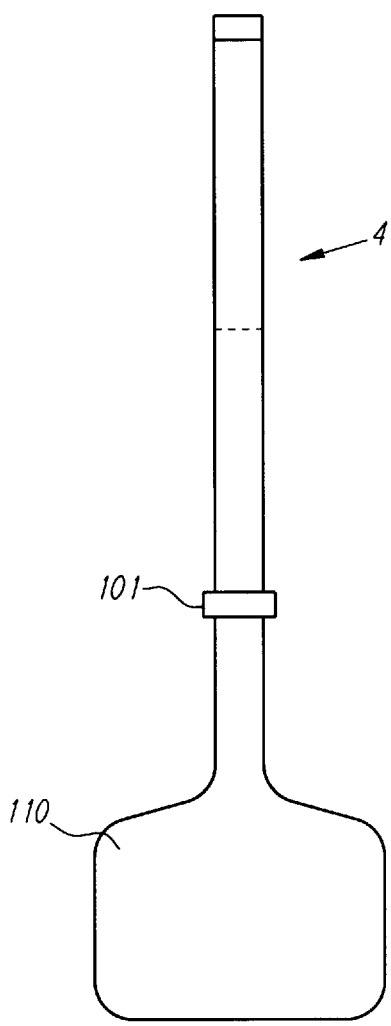
FIG. 8b provides a front view of a third alternative embodiment of the present invention.

FIGS. 8a and 8b illustrate an extraction device 4 according to a third alternative embodiment of the present invention. Extraction device 4 according to the present embodiment includes a first rod 90 and a second rod 100. Rods 90 and 100 are attached along a portion of their lengths. Rods 90 and 100 can be attached using a number of techniques well known in the art such as welding, brazing, gluing, or simply by wrapping with wire or other suitable material. The unattached portions 98, 108 of rods 90 and 100, respectively, extend outward at an obtuse angle from a contact point 96 located approximately medially along the length of rods 90 and 100 to form a Y-spring 106. Further, at the insertion end 94, 104 of each of the unattached portions 98, 108 is formed, or attached, an opposing hook 92, 102 which extends outward from the contact point 96. When the Y-spring 106 is in the relaxed state as illustrated in FIG. 8a, it should be of sufficient size to permit opposing hooks 92, 102 to extend over upper surface 34 of hub 28 to permit engagement of opposing hooks 92, 102 with the upper surface 34 of hub 28. The individual widths of rods 90 and 100, along with the lengths of opposing hooks 92, 102, however, are sufficiently smaller than the diameter of aperture 30 to permit hooks 92, 102 to be inserted into and through aperture 30 when Y-spring 106 is compressed.

Manual pressure by the user applied at a point between contact point 96 and opposing hooks 92, 102 compresses Y-spring 106 and thereby permits opposing hooks 92, 102 to be inserted into and through aperture 30. After opposing hooks 92 and 102 are inserted through aperture 30, the release of manual pressure decompresses the Y-spring 106 and facilitates engagement of opposing hooks 92, 102 against upper surface 34. Engagement of opposing hooks 92, 102 against upper surface 34 couples extraction device 4 according to this embodiment to kneading paddle 16. Once coupled, manual pulling on one or both rods 90 or 100 or optional handle 110 affixed at handle end 108 to rods 90 and 100 removes the extraction device 4 according to this embodiment and kneading paddle 16 from the loaf of bread.

Although as described above, manual pressure applied by the operator can be used to compress Y-spring 106, preferably an optional spring compressing member 101 is provided to aid in compressing Y-spring 106. As would be apparent to those skilled in the art, spring compressing member 101 can take many forms, but generally will be comprised of a ring or C-clip that wraps substantially around both rods 90 and 100. When spring compressing member 101 is slid longitudinally along rods 90, 100 toward insertion ends 94, 104, Y-spring 106 is compressed; alternately, when spring compressing member 101 is slid toward handle end 108, Y-spring 106 returns to a relaxed position.

Figure 9A:
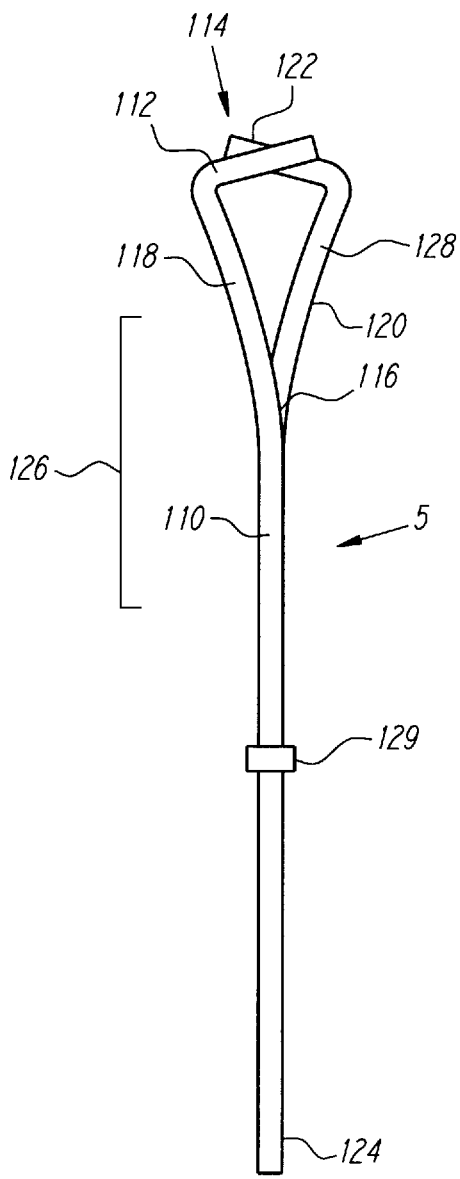
FIG. 9a provides a side view of a fourth alternative embodiment of the present invention, this embodiment employing a Y-spring and outward-facing hooks, with the Y-spring in a relaxed position to permit insertion of the hooks into the kneading paddle hub aperture.
Figure 9B:
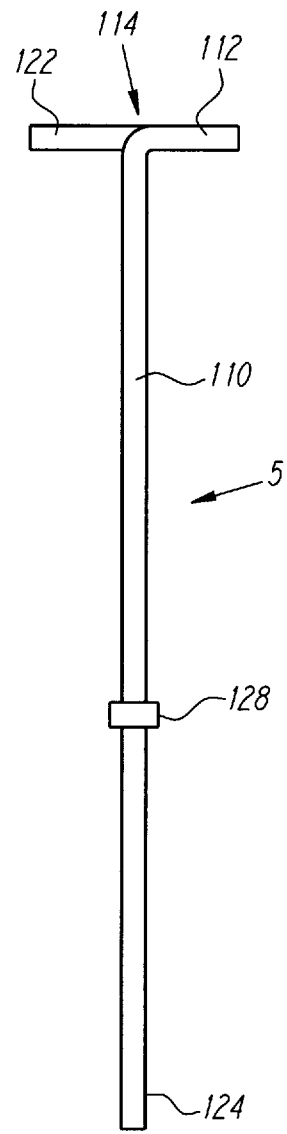
FIG. 9b provides a side view of the fourth alternative embodiment of the present invention, with the Y-spring in a compressed position to permit engagement to the kneading paddle.

FIGS. 9a and 9b illustrate an extraction device 5 according to a fourth alternative embodiment of the present invention. Extraction device 5 according to the present embodiment includes a first rod 110 and a second rod 120. Rods 110 and 120 are attached along a portion of their lengths. Rods 110 and 120 can be attached using a number of techniques well known in the art such as welding, brazing, gluing, or simply wrapping with wire or other suitable material. The unattached portions 118, 128 of rods 110 and 120, respectively, extend outward at an obtuse angle from a contact point 116 to form Y-spring 126. Further, at the end of each of the unattached portions 118, 128 is formed, or attached, a hook 112, 122, extending inward toward the longitudinal axis defined by the attached portions of rods 110 and 120. When the Y-spring is in the relaxed state as illustrated in FIG. 9a, it should be of sufficient size to permit hooks 112, 122 to be inserted through aperture 30. For the same reason, the individual widths of rods 110 and 120 should each be smaller than the diameter of aperture 30.

Upon insertion of hooks 112 and 122 into and through aperture 30, manual pressure applied by the user at a point intermediate to contact point 116 and insertion end 114 of rods 110, 120 compresses Y-spring 66. Compression of Y-spring 126, in turn, thrusts hooks 112 and 122 across the common longitudinal plane of rods 110 and 120 and laterally outward to facilitate engagement of hooks 112 and 122 against upper surface 34 of hub 28. Sustained manual pressure or sustained positioning of spring compressing member between contact point 116 and insertion end 114 thus couples the device according to this embodiment to kneading paddle 16. Once coupled, manual pulling on one or both rods or on optional handle (not illustrated) affixed thereto removes the device according to this embodiment and kneading paddle 16 from the loaf of bread.

Although as described above, manual pressure applied by the operator can be used to compress Y-spring 126, preferably an optional spring compressing member 128 is provided to aid in compressing Y-spring 126. As would be apparent to those skilled in the art, spring compressing member 128 can take on many forms, but generally will be comprised of a ring or C-clip that wraps substantially around both rods 110 and 120. When spring compressing member 128 is slid longitudinally along rods 110, 120 toward insertion ends 118, 128, Y-spring 126 is compressed; alternately, when spring compressing member 128 is slid toward handle end 124, Y-spring 126 returns to a relaxed position. FIG. 9b illustrates spring compressing member 128 in phantom to show spring compressing member in a position for compressing the Y-spring.

Figure 10C:
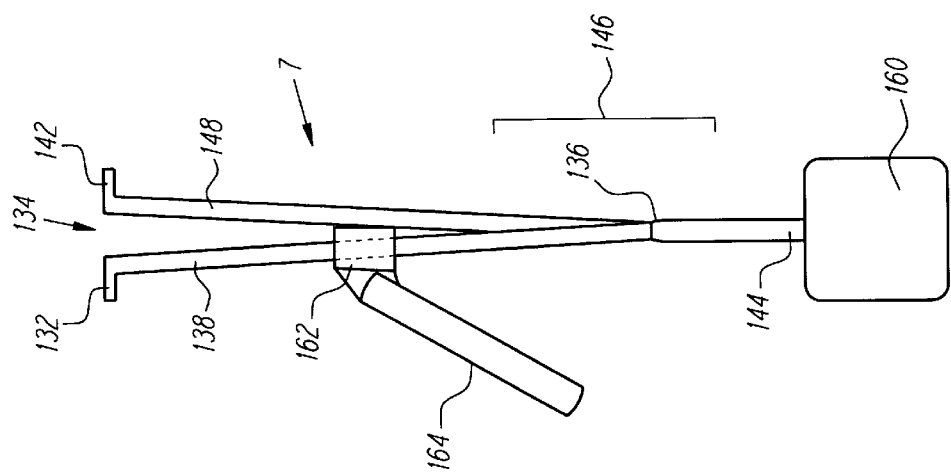
FIG. 10c provides a front view of the sixth alternative embodiment of the present invention illustrated in FIG. 10b.
Figure 10B:
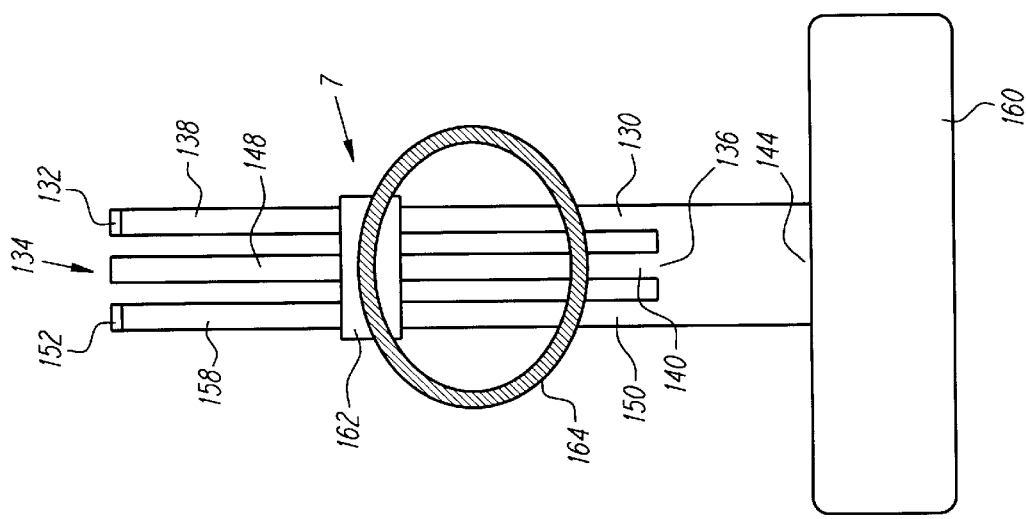
FIG. 10b provides a side view of a sixth alternative embodiment of the present invention, this embodiment employing a W-spring with outward-facing hooks and a spring extending member.
Figure 10A:
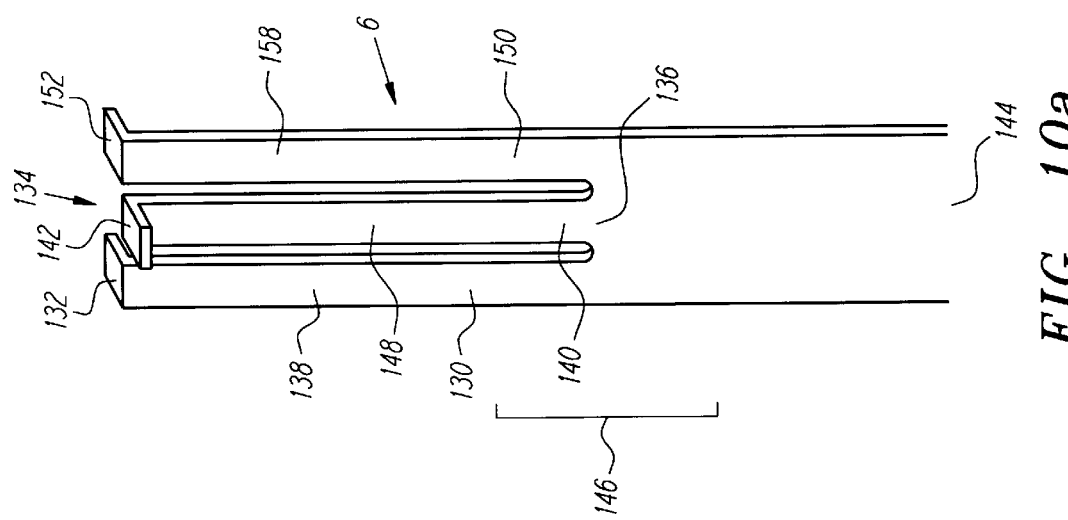
FIG. 10a provides a perspective view of a fifth alternative embodiment of the present invention, this embodiment employing a W-spring and outward-facing hooks, with the W-spring in a relaxed position to permit engagement to the kneading paddle.

FIG. 10a illustrates an extraction device 6 according to a fifth alternative embodiment of the present invention. Extraction device 6 according to the present embodiment includes a first rod 130, a second rod 140, and a third rod 150. Rods 130, 140, and 150 are attached along a portion of their lengths. Rods 130, 140, and 150 may either be integral at some point medial to insertion end 134 and handle end 144, or rods 130, 140, and 150 may be attached using a number of techniques well known in the art such as welding, brazing, gluing, or simply by wrapping with wire or other suitable material. The unattached portions 138, 148, and 158 of rods 130, 140, and 150, respectively, extend upward from a contact point 136 to form a W-spring 146. At the end of the unattached portions 138, 148, and 158 are formed, or attached, opposing hooks 132, 142, and 152, respectively, which extend outward from the contact point 136. Preferably the outer hooks 132, 142 extend in the opposite direction that the central hook 134 is extended. When the W-spring is in the relaxed state (as illustrated in FIG. 10a), it should be of sufficient size to permit hooks 132, 142, and 152 to be inserted into and through aperture 30. Similarly, the combined lengths of any two opposing hooks 132, 142, and 152 should be smaller than the diameter of aperture 30.

Upon insertion of hooks 132, 142, and 152 through aperture 30, manual pressure applied by the user to rod 140 at a point between the W-spring 146 and hooks 132, 142, and 152 extends W-spring 146. Extension of the W-spring 146 thrusts hook 142 outward and away from hooks 132 and 152. When the W-spring is in the extended state, it should be of sufficient size to permit opposing hooks 132, 142, and 152 to extend over upper surface 34 of hub 28 to permit engagement of opposing hooks 132, 142, and 152 with the upper surface 34. Coupling between the device according to this embodiment and kneading paddle 16 is maintained by the sustained application of manual pressure which keeps W-spring 146 extended. Once coupled, manual pulling on one or more rods or an optional handle (not illustrated) affixed to the handle end 144 removes extraction device 6 according to this embodiment and kneading paddle 16 from the loaf of bread.

FIGS. 10b and 10c illustrate an extraction device 7 according to a sixth alternative embodiment of the present invention. Extraction device 7 is substantially the same as extraction device 6, but additionally includes a spring extending member 162 which is slidably mounted to one or more of rods 130, 140, and 150. By way of example, the spring extending member 162 illustrated in FIGS. 10b and 10c is slidably mounted to rods 130 and 150. An optional means for grasping spring extending member 162 may be provided, such as finger ring 164 which is illustrated in FIGS. 10b and 10c.

Operation of extraction device 7 is similar to that of extraction device 6, except that manual sliding of spring extending member 162 instead of manual pressure is used to extend W-spring 146. Before insertion of hooks 132, 142, and 152 through aperture 30, spring extending member 162 is placed in a retracted position close to insertion end 134 of rods 130, 140, and 150. Spring extending member 162, rods 130, 140, and 150, and hooks 132, 142, and 152 must be of sufficiently small sizes to permit hooks 132, 142, and 152 to be inserted through aperture 30 when spring extending member 162 is retracted. After insertion of hooks 132, 142, and 152 through aperture 30, manual sliding of spring extending member 162 toward handle end 144 extends W-spring 144, thus thrusting hook 142 outward and away from hooks 132 and 152. When the W-spring is in the extended state, it should be of sufficient size to permit opposing hooks 132, 142, and 152 to extend over upper surface 34 of hub 28 to permit engagement of opposing hooks 132, 142, and 152 with the upper surface 34. Coupling between the device according to this embodiment and kneading paddle 16 is maintained so long as the W-spring remains extended by spring extending member 162. Once coupled, manual pulling on one or more rods or optional handle portion 160 affixed thereto removes extraction device 7 according to this embodiment and kneading paddle 16 from the loaf of bread.

As would be apparent to those skilled in the art, similar but alternative embodiments to extraction devices 6 and 7 could be fabricated with a W-spring which is open in the relaxed position. Though not illustrated, such alternative embodiments would require either the application of manual pressure or the sliding of a spring compressing member toward the insertion end of rods 130, 140, and 150 to compress the W-spring for insertion into aperture 30. Similarly, the release of manual pressure or the sliding of such a spring compressing member toward handle end 144 after insertion would couple the extraction device to the kneading paddle.

Referring generally to FIGS. 5a through 10c, rods 50, 70, 80, 90, 100, 110, 130, 140, and 150 (depending on the embodiment), and corresponding hooks 52, 72, 82, 92, 102, 112, 122, 132, 142, and 152 (depending on the embodiment) are preferably made from steel coated with a non-stick material to protect against corrosion, permit easy cleaning, and (in the preferred embodiment) facilitate easy sliding of wedge 54. Rods 50, 70, 80, 90, 100, 110, 130, 140, and 150, and their corresponding hooks, may alternatively be fashioned from stainless steel, which would eliminate the need for a coating to protect against corrosion but not necessarily address cleaning or corrosion concerns. For extraction devices 1, 2, and 3, which do not employ a Y- or W-spring, and therefore do not necessarily require materials with spring and fatigue characteristics similar to steel, aluminum or a hard plastic could also be used for rods 50, 70, and/or 80 and their corresponding hooks. In the preferred embodiment, which employs a wedge, wedge 54 is preferably made from plastic to further ensure easy sliding along rod 50 and to permit economical fabrication. Similarly, spring compressing members 101 and 128, in addition to spring extension member 162, are preferably made of plastic to permit easy sliding.

What is claimed is:

1. A kneading paddle extraction device for extracting a kneading paddle of an automatic bread-making machine, wherein the kneading paddle includes a hub with an upper surface and an aperture that extends through the hub to the upper surface of the hub, from a loaf of bread made by the machine, the extraction device comprising:

(a) a rod having a longitudinal axis, an insertion end, and a handle end; and (b) a hook which projects outward from the insertion end of the rod, the length which the hook projects from the longitudinal axis of the rod being smaller than the diameter of the aperture of the kneading paddle.

2. The device of claim 1, further comprising:

a wedge slidably mounted to the rod.

3. The device according to claim 2, wherein the wedge is slidably mounted to the rod by a coupling member attached to the wedge and which extends circumferentially around the rod.

4. The device according to claim 2, wherein the wedge has an insertion end proximal the insertion end of the rod and an outward end distal to the insertion end of the rod, and the wedge is tapered in longitudinal profile in a direction from the insertion end toward the outward end to enhance the coupling action of the device to the kneading paddle hub.

5. The device according to claim 2, wherein the wedge has an insertion end proximal the insertion end of the rod and an outward end distal to the insertion end of the rod, and the wedge is tapered in longitudinal profile in a direction from the outward end toward the insertion end to permit easy insertion of the wedge into the aperture of the kneading paddle hub.

6. A kneading paddle extraction device for extracting a kneading paddle of an automatic bread-making machine, wherein the kneading paddle includes a hub with an upper surface and an aperture that extends through the hub to the upper surface of the hub, from a loaf of bread made by the machine, the extraction device comprising:

a first and a second rod, each rod having a longitudinal axis, an insertion end, and a handle end, the first and second rods being rotatably attached along a portion of their lengths;

a first hook which projects outward from the insertion end of the first rod, the length which the hook projects outward from the longitudinal axis of the first rod is less than the diameter of the kneading paddle aperture; and a second hook which projects outward from the insertion end of the second rod, the length which the hook projects outward from the longitudinal axis of the second rod is less than the diameter of the kneading paddle aperture, and wherein the combined width of the first and second hooks is less than the diameter of the kneading paddle aperture and the combined length of the first and second hooks is greater than the diameter of the kneading paddle aperture.

7. A kneading paddle extraction device for extracting a kneading paddle of an automatic bread-making machine, wherein the kneading paddle includes a hub with an upper surface and an aperture that extends through the hub to the upper surface of the hub, from a loaf of bread made by the machine, the extraction device comprising:

a first and a second rod, each rod having a longitudinal axis, an insertion end, a handle end, and an unattached portion, the first and second rods being attached along a portion of their lengths, the unattached portions of the first and second rods forming a Y-spring which narrows in a direction toward the handle ends of the first and second rods;

a first hook which extends outward from the insertion end of the first rod, the width of the first hook is less than the diameter of the kneading paddle aperture;

a second hook which projects outward from the insertion end of the second rod, the width of the second hook is less than the diameter of the kneading paddle aperture, the combined lengths at which the first and second hooks project outward from the longitudinal axes of the first and second rods, respectively, is less than the diameter of the kneading paddle aperture, and the combined lengths at which the first and second hooks project outward from the longitudinal axes of the first and second rods, respectively, in addition to the distance between the insertion ends of the first and second rods when the Y-spring is relaxed, is greater than the diameter of the kneading paddle aperture.

8. The device of claim 7, further comprising:

a spring compressing member slidably attached to the first and second rods.

9. A kneading paddle extraction device for extracting a kneading paddle of an automatic bread-making machine, wherein the kneading paddle includes a hub with an upper surface and an aperture that extends through the hub to the upper surface of the hub, from a loaf of bread made by the machine, the extraction device comprising:

a first and a second rod, each rod having a longitudinal axis, an insertion end, a handle end, and an unattached portion, the first and second rods being attached along a portion of their lengths, the unattached portions of the first and second rods forming a Y-spring which narrows in a direction toward the handle ends of the first and second rods, the distance between the insertion ends of the first and second rods when the Y-spring is relaxed is less than the diameter of the kneading paddle aperture;

a first hook which extends inward from the insertion end of the first rod, the width of the first hook is less than the diameter of the kneading paddle aperture;

a second hook which projects inward from the insertion end of the second rod, the width of the second hook is less than the diameter of the kneading paddle aperture, and the combined length at which the first and second hooks project outward from the longitudinal axes of the first and second rods, respectively, is greater than the diameter of the kneading paddle aperture.

10. The device of claim 9, further comprising:

a spring compressing member slidably attached to the first and second rods.

11. A kneading paddle extraction device for extracting a kneading paddle of an automatic bread-making machine, wherein the kneading paddle includes a hub with an upper surface and an aperture that extends through the hub to the upper surface of the hub, from a loaf of bread made by the machine, the extraction device comprising:

a first, a second, and a third rod, each rod having a longitudinal axis, an insertion end, a handle end, and an unattached portion, the first, second, and third rods being attached along a portion of their lengths, the unattached portions of the first and second rods forming a W-spring by which the insertion ends of the first, second, and third rods may be moved out of the plane joining the first, second, and third rods;

a first hook which extends outward from the insertion end of the first rod, the length of the first hook is less than the diameter of the kneading paddle aperture;

a second hook which extends outward from the insertion end of the second rod, the length of the second hook is less than the diameter of the kneading paddle aperture;

a third hook which extends outward from the insertion end of the third rod, the length of the third hook is less than the diameter of the kneading paddle aperture, and the combined widths of the first, second, and third hooks plus the lateral distance between the first, second, and third hooks is greater than the diameter of the kneading paddle.

12. The device according to claim 11, further comprising:

a spring extending member which is slidably attached to at least one of the first, second and third rods, the spring extending member extending the W-spring and thereby thrusting the insertion end of the second rod in a relative direction away from the insertion ends of the first and third rods when the spring extending member is slid toward the insertion ends of the first, second, and third rods.

13. The device according to claim 12, further comprising means for grasping the spring extending member.

14. The device according to claim 13, wherein the means for grasping the spring extending member comprises a finger ring attached to the spring extending member.

15. A method of extracting a kneading paddle of an automatic bread-making machine, the kneading paddle containing an upper surface and a substantially central aperture, from a loaf of bread with minimal damage to the bread, the method comprising the steps of:

(a) locating the substantially central aperture of the kneading paddle;

(b) inserting an extraction device into the aperture of the kneading paddle, the extraction device comprising:

(i) a rod with a longitudinal axis, an insertion end, and a handle end, (ii) a hook which projects outward from the insertion end of the rod, the length of the hook being smaller than the diameter of the aperture of the kneading paddle, (iii) a wedge slidably mounted to the rod, and (iv) means for sliding the wedge along the longitudinal axis of the rod;

(c) engaging the hook against the upper surface of the kneading paddle;

(d) sliding the wedge into the aperture to firmly position and couple the hook against the upper surface of the kneading paddle; and (e) manually pulling the handle end of the rod to extract the coupled device and kneading paddle from the loaf of bread.

\* \* \* \* \*

UNITED STATES PATENT AND TRADEMARK OFFICE
CERTIFICATE OF CORRECTION

PATENT NO. : 5,839,358
DATED : November 24, 1998
INVENTOR(S) : Edward Malecki

It is certified that error appears in the above-identified patent and that said Letters Patent is hereby corrected as shown below:

Column 3, line 1, delete "FIG. 4 provides" and insert --FIGS. 4a-4j provide--.

Column 4, lines 18 and 19, delete "FIG. 4, for example, illustrates" and insert --FIGS. 4a-4j, for example, illustrate--.

Figure 7C:
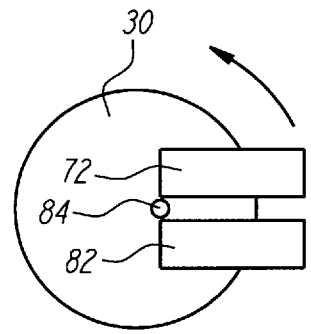
Figure 7D:
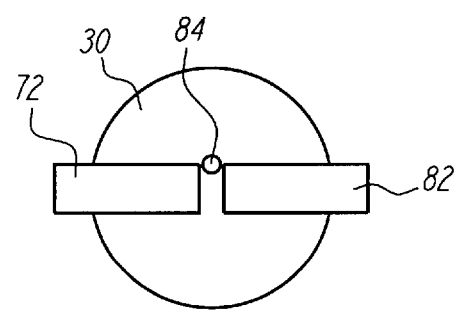

Column 6, line 1, delete "FIG. 7b illustrates" and insert --FIGS. 7b-7d illustrate--.

UNITED STATES PATENT AND TRADEMARK OFFICE
CERTIFICATE OF CORRECTION

PATENT NO. : 5,839,358
DATED : November 24, 1998
INVENTOR(S) : Edward Malecki

It is certified that error appears in the above-identified patent and that said Letters Patent is hereby corrected as shown below:

Column 7, lines 23 and 24, delete "spring compressing member" and insert --a spring compressing member 129--.

Column 7, line 32, change "128" to --129--.

Column 7, line 35, change "128" to --129--.

Column 7, line 38, change "128" to --129--.

Column 7, line 40, change "128" to --129--.

Column 7, line 42, change "128" to --129--.

Column 9, line 19, change "128" to --129--.

Signed and Sealed this

Thirteenth Day of July, 1999

*Attest:*

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,839,358
DATED : Nov. 24, 1998
INVENTOR(S) : Edward Malecki

It is certified that error appears in the above-identified patent and that said Letters Patent is hereby corrected as shown below:

Figure 9b, change "128" to --129--

Signed and Sealed this

Eighteenth Day of April, 2000

Attest:

Q. TODD DICKINSON

*Attesting Officer*         *Director of Patents and Trademarks*